(12) United States Patent
Choi et al.

(10) Patent No.: US 11,619,859 B2
(45) Date of Patent: Apr. 4, 2023

(54) SINGLE OPTICAL PHASE ARRAY AND PHOTOSENSING SYSTEM INCLUDING THE SAME

(71) Applicant: Research & Business Foundation Sungkyunkwan University, Suwon-si (KR)

(72) Inventors: Byoung Lyong Choi, Seoul (KR); Dongmok Whang, Suwon-si (KR); Tae Jun Gu, Seongnam-si (KR); Sung Won Moon, Gunpo-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 0 days.

(21) Appl. No.: 17/515,906

(22) Filed: Nov. 1, 2021

(65) Prior Publication Data
US 2022/0137481 A1    May 5, 2022

(30) Foreign Application Priority Data
Nov. 4, 2020    (KR) .......................... 10-2020-0146107

(51) Int. Cl.
G02F 1/313    (2006.01)
G02F 1/29     (2006.01)

(52) U.S. Cl.
CPC ............ G02F 1/3138 (2013.01); G02F 1/292 (2013.01)

(58) Field of Classification Search
CPC ...................................................... G02F 1/3138
See application file for complete search history.

(56) References Cited

U.S. PATENT DOCUMENTS

| | | | |
|---|---|---|---|
| 11,092,691 B2 * | 8/2021 | Shim ...................... G01S 17/42 |
| 2021/0063840 A1 * | 3/2021 | Figeys .................. G01S 7/4817 |
| 2021/0293934 A1 * | 9/2021 | Sun ........................ G01S 7/4911 |
| 2022/0137481 A1 * | 5/2022 | Choi ..................... G02F 1/3138 385/2 |

FOREIGN PATENT DOCUMENTS

KR    10-1720434 B1    3/2017

* cited by examiner

*Primary Examiner* — Rhonda S Peace
(74) *Attorney, Agent, or Firm* — NSIP Law

(57) ABSTRACT

The present disclosure relates to a single OPA (optical phased array) device including a light source; a waveguide which extends from the light source to allow light incident from the light source to pass through; a plurality of modulators which is disposed in the waveguide to modulate a phase of light in the waveguide; a two-dimensional material layer which passes or absorbs light incident from the light source; and an electrode which supplies charges to the two-dimensional material layer, in which the light incident from the light source passes through the two-dimensional material layer, the waveguide, and the modulator and is reflected by an external target of the single OPA device to pass through the modulator and the waveguide, and then absorbed by the two-dimensional material layer.

18 Claims, 12 Drawing Sheets

SINGLE OPTICAL PHASE ARRAY AND PHOTOSENSING SYSTEM INCLUDING THE SAME

CROSS-REFERENCE TO RELATED APPLICATIONS

This application claims the priority of Korean Patent Application No. 10-2020-0146107 filed on Nov. 4, 2020, in the Korean Intellectual Property Office, the disclosure of which is incorporated herein by reference.

BACKGROUND

Field

The present disclosure includes a single optical phased array and a photosensing system including the same.

Description of the Related Art

For the convenience of users who use vehicles, various sensors and electronic devices are being provided. Specifically, research on an advanced driver assistance system (ADAS) is being actively conducted for user's driving convenience. In addition, autonomous vehicles are actively being developed.

In order to realize such an autonomous vehicle, the distance to an object needs to be checked by a machine, rather than a human and LiDAR which measures a distance between objects in real time using light such as a laser beam is representative of the positioning technology. The LiDAR may measure a distance by emitting light by a mechanical method which mechanically rotates LD and PD to measure a distance, a MEMS method which changes an inclination angle of light by a voltage, a flash method which uses an optical flash, or an optical phase array (OPA) method which electrically controls a velocity of light.

Among them, the OPA technique refers to a technique which provides a heating wire which controls a temperature on a waveguide channel to control a phase of light which propagates in the waveguide channel, basically using a characteristic in that a refractive index of a waveguide material changes according to the temperature. However, the OPA device of the related art has different parts to emit and receive light so that it is not easy to commercialize the OPA device due to a complex structure and control difficulty.

Korean Registered Patent Publication No. 10-1720434 which is a background art of the present disclosure discloses a photonic phased array antenna. An element which configures the photonic phased array antenna of the registered patent only includes a light source and a radiator which emits a light wave, but does not recognize a light wave receiving unit.

SUMMARY

An object of the present disclosure is to solve the problems of the related art and to provide a single OPA device which realizes the size reduction and simplification of the structure and a manufacturing method thereof.

Further, an object of the present disclosure is to provide a photosensing system including the single OPA device.

However, objects to be achieved by various embodiments of the present disclosure are not limited to the technical objects as described above and other technical objects may be present.

As a technical means to achieve the above-described technical object, according to a first aspect of the present disclosure, a single optical phased array (OPA) device includes a light source; a waveguide which extends from the light source to allow light incident from the light source to pass through; a modulator which is disposed in the waveguide to modulate a phase of light in the waveguide; a two-dimensional material layer which passes or absorbs light incident from the light source; and an electrode which supplies charges to the two-dimensional material layer, in which the light incident from the light source passes through the two-dimensional material layer, the waveguide, and the modulator and the light emitted from the single OPA device is reflected by an external target of the single OPA device to pass through the modulator and the waveguide, and then absorbed by the two-dimensional material layer.

According to an embodiment of the present disclosure, the two-dimensional material layer may pass or absorb light incident from the light source according to a voltage applied to the two-dimensional material layer, but is not limited thereto.

According to an embodiment of the present disclosure, charge carriers may be accumulated or depleted in an energy band structure of the two-dimensional material layer, according to a voltage applied to the two-dimensional material layer, but is not limited thereto.

According to an embodiment of the present disclosure, the modulator may modulate a phase of light incident from the light source and light reflected by the target, but is not limited thereto.

According to an embodiment of the present disclosure, the two-dimensional material layer may include a material selected from a group consisting of graphene, transition metal chalcogenide, hexagonal boron nitride (h-BN), black phosphorus, and combinations thereof, but is not limited thereto.

According to an embodiment of the present disclosure, a wavelength of light incident from the light source may be 750 nm to 2000 nm, but is not limited thereto.

According to an embodiment of the present disclosure, the waveguide may include a material selected from a group consisting of a group IV semiconductor material, a group III-V semiconductor material, a group II-VI semiconductor material, oxides, nitrides, and combinations thereof, but is not limited thereto.

According to an embodiment of the present disclosure, the waveguide may include a waveguide which extends from the light source, but is not bifurcated and a plurality of bifurcated waveguides which extends from the waveguide which is not bifurcated to be divided into several parts, but is not limited thereto.

According to an embodiment of the present disclosure, the two-dimensional material layer may be formed on the waveguide, which is not bifurcated, but is not limited thereto.

According to an embodiment of the present disclosure, the electrode may include a material selected from a group consisting of Au, Pt, Ti, Ag, Ni, Zr, Ta, Zn, Nb, Cr, Co, Mn, Fe, Al, Mg, Si, W, Cu, lanthanum metals, nitrides thereof, oxides thereof, conductive polymers, and combinations thereof, but is not limited thereto.

According to an embodiment of the present disclosure, the single OPA device may further include an antenna selected from a group consisting of an emission antenna which irradiates light of the light source onto the target, a reception antenna which receives light reflected from the target, and combinations thereof, but is not limited thereto.

According to an embodiment of the present disclosure, the single OPA device may further include a two-dimensional material layer formed on the waveguide, but is not limited thereto. That is, the single OPA device may further include not only the two-dimensional material layer formed on the waveguide, which is not bifurcated, but also the two-dimensional material layer formed on the plurality of bifurcated waveguides.

According to an embodiment of the present disclosure, the single OPA device may further include an intermediate layer formed on the two-dimensional material layer formed on the waveguide, but is not limited thereto.

According to a second aspect of the present disclosure, a manufacturing method of a single OPA device includes forming a light source, a two-dimensional material layer, a waveguide, and modulators on a substrate; and forming an electrode on the two-dimensional material layer.

According to an embodiment of the present disclosure, the manufacturing method of a single OPA device may further include forming a two-dimensional material layer on the waveguide, but is not limited thereto.

According to an embodiment of the present disclosure, the manufacturing method of a single OPA device may further include forming an intermediate layer on the two-dimensional material layer formed on the waveguide, but is not limited thereto.

According to an embodiment of the present disclosure, the manufacturing method of a single OPA device may further include forming an antenna selected from a group consisting of an emission antenna, a reception antenna, and combinations thereof which extend from the waveguide or the modulator, on the substrate, but is not limited thereto.

According to a third aspect of the present disclosure, a photosensing method includes emitting light toward an external target from a light source of the single OPA device according to the first aspect, receiving light reflected from the external target into the single OPA device; and absorbing light received into the single OPA device by a two-dimensional material layer.

According to an embodiment of the present disclosure, a photo absorptivity of the two-dimensional material layer may be adjusted by a voltage applied to the two-dimensional material layer, but is not limited thereto.

According to an embodiment of the present disclosure, light incident from the light source may pass through the two-dimensional material layer, and light reflected from the external target may be absorbed by the two-dimensional material layer, but is not limited thereto.

The above-described solving means are merely illustrative but should not be construed as limiting the present disclosure. In addition to the above-described embodiments, additional embodiments may be further provided in the drawings and the detailed description of the present disclosure.

According to the above-described solving means, in the single OPA device according to the present disclosure, a part for emitting light and a part for receiving reflected light are combined on one substrate so that the size reduction as compared with the OPA device of the related may be achieved.

Further, the single OPA device according to the present disclosure performs the scan control of emission and reception by one step and has the same optical axis to improve a light reception efficiency so that it is advantageous to implement a high-performance photosensing system.

Further, the single OPA device according to the present disclosure uses graphene to receive reflected light so that unlike the OPA device of the related art, a photo diode for receiving reflected light and a lens for adjusting a direction of the reflected light are not required to have a simplified structure.

However, the effect which can be achieved by the present disclosure is not limited to the above-described effects, there may be other effects.

BRIEF DESCRIPTION OF THE DRAWINGS

The above and other aspects, features and other advantages of the present disclosure will be more clearly understood from the following detailed description taken in conjunction with the accompanying drawings, in which.

Figure 3:
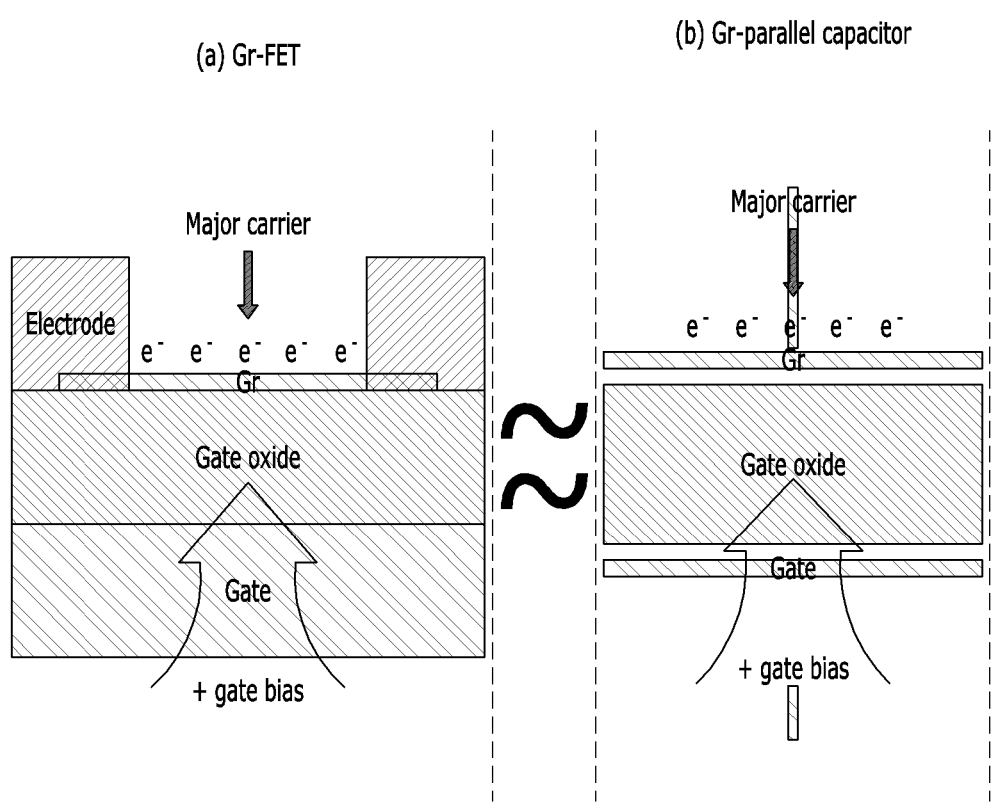
Figure 4:
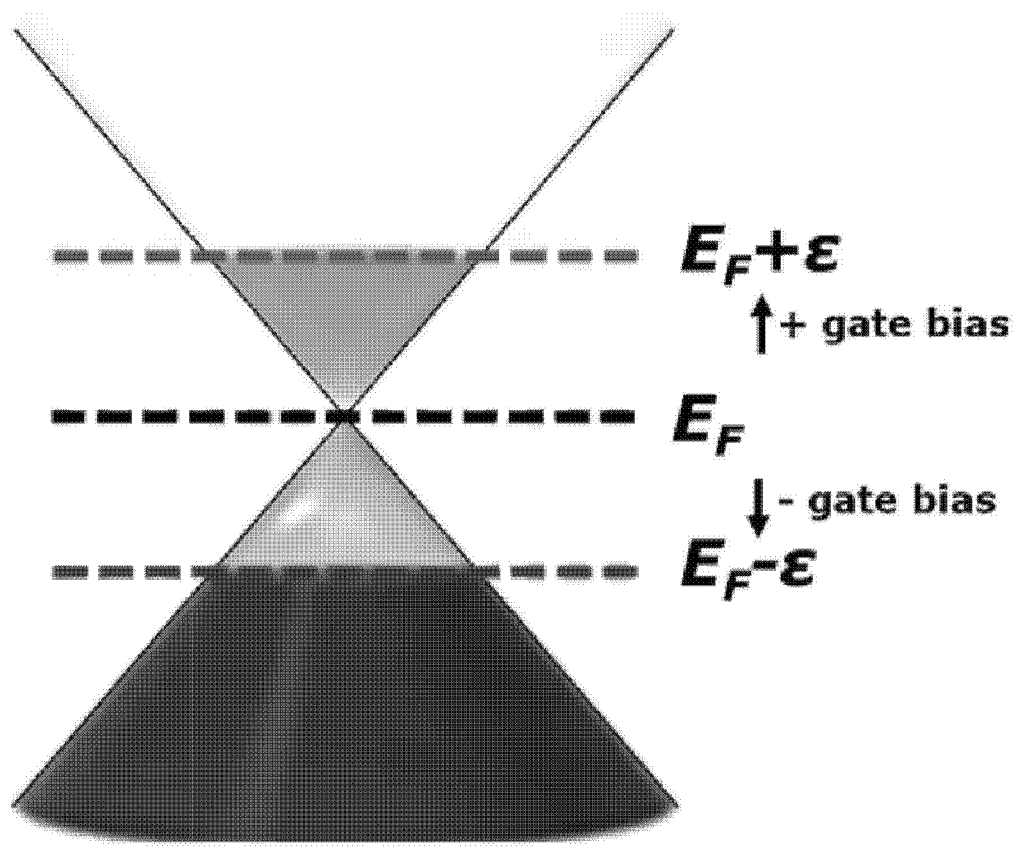
Figure 5:
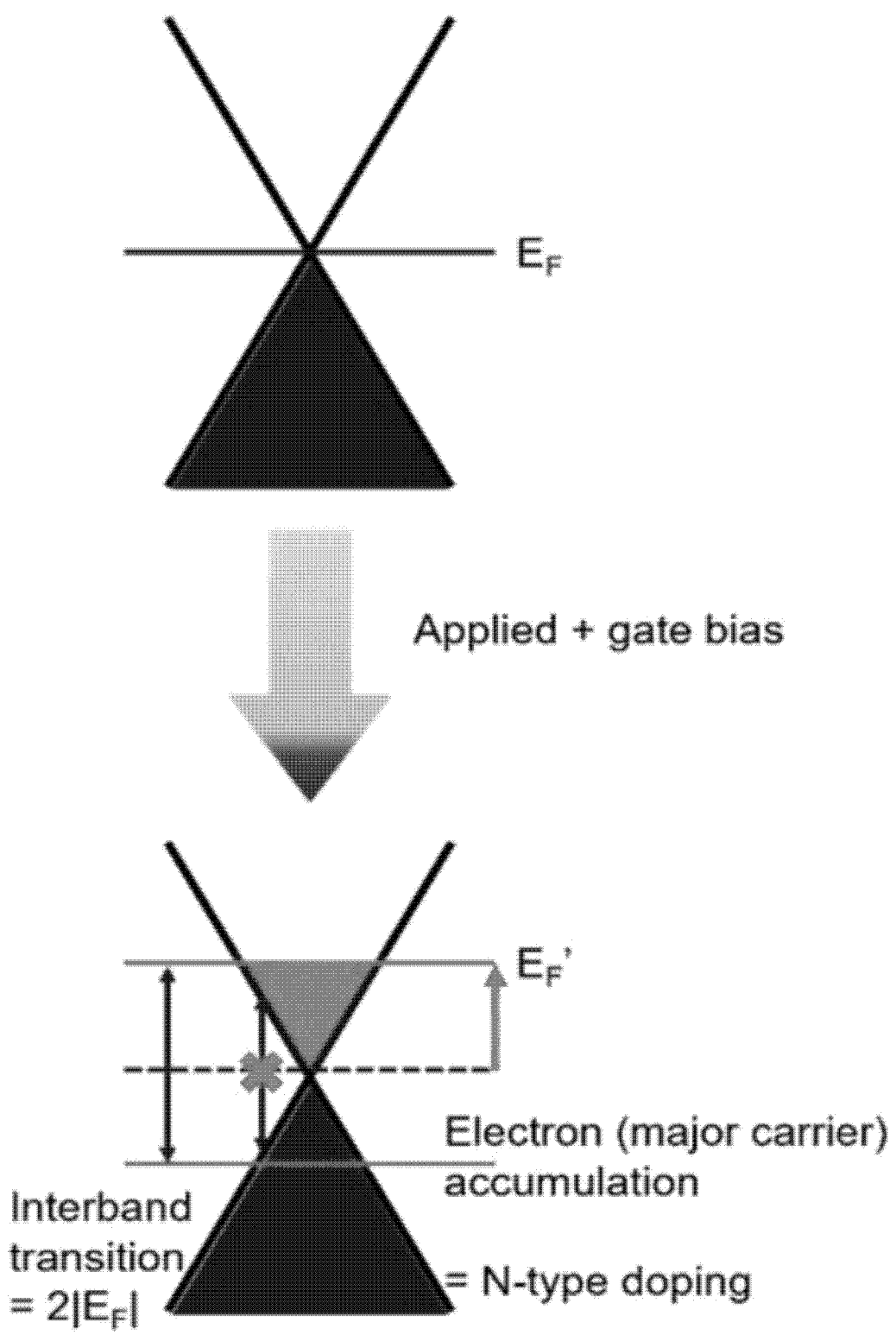
Figure 6:
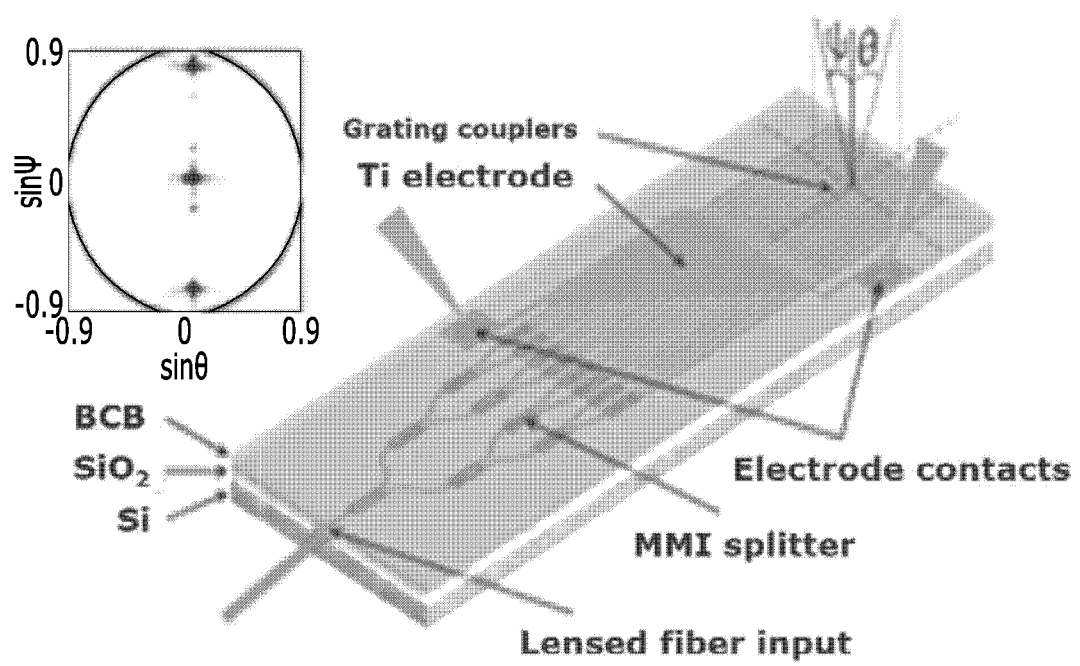
Figure 7:
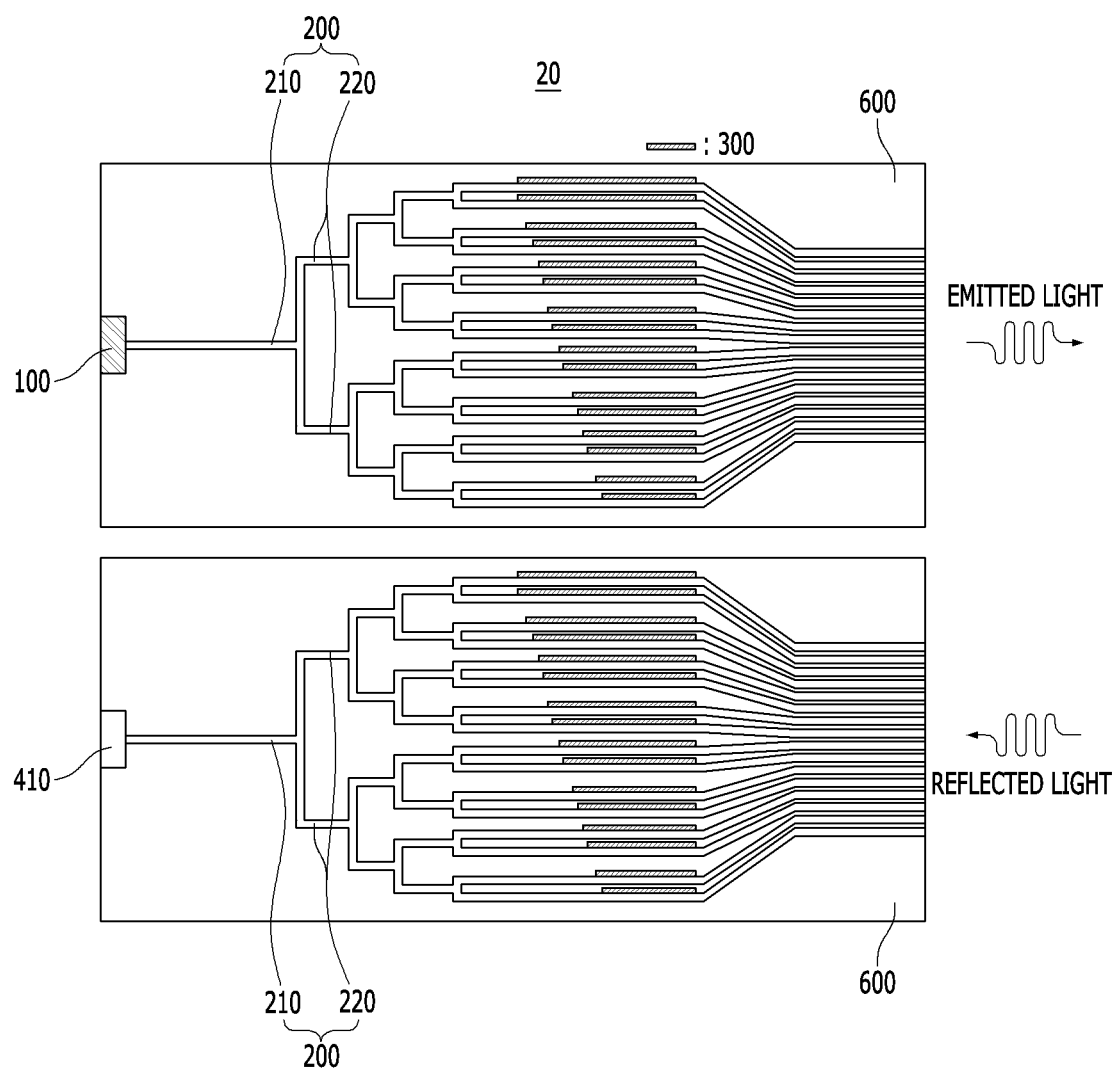
Figure 8:
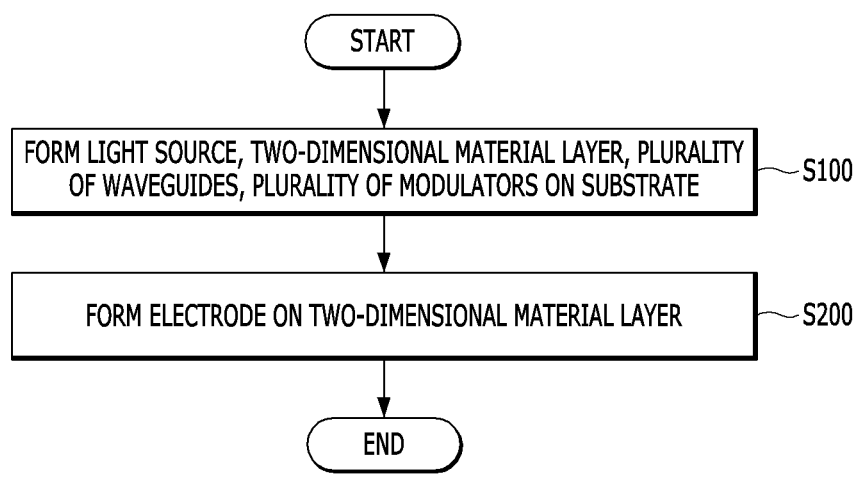
Figure 9:
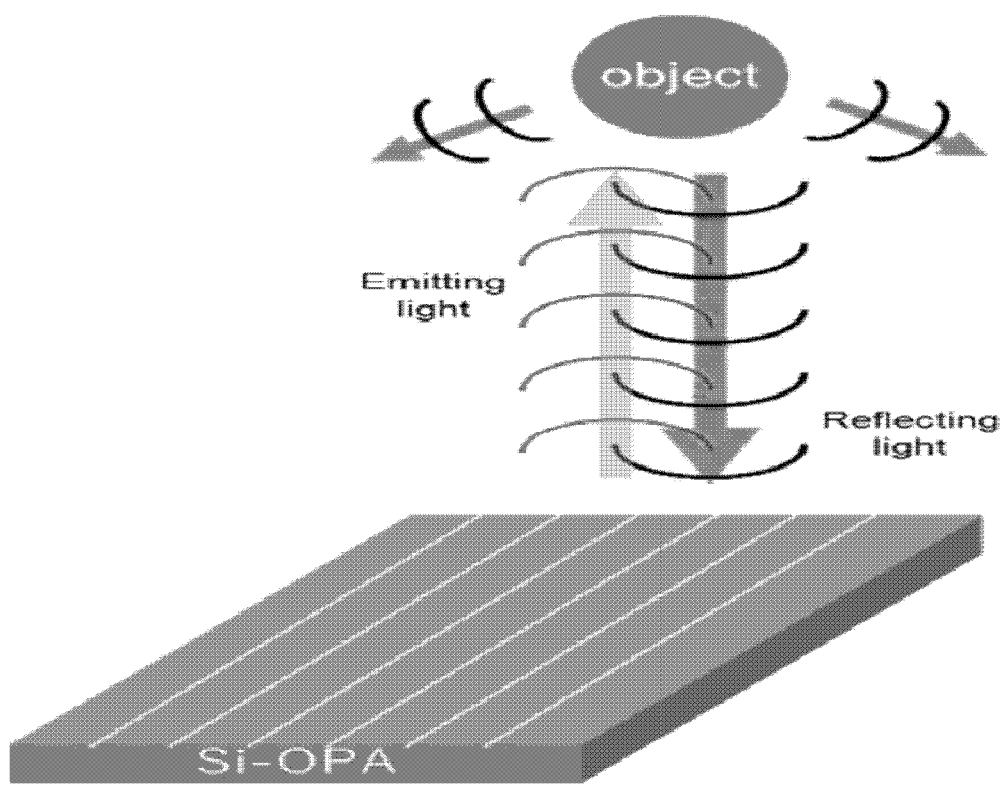
Figure 10:
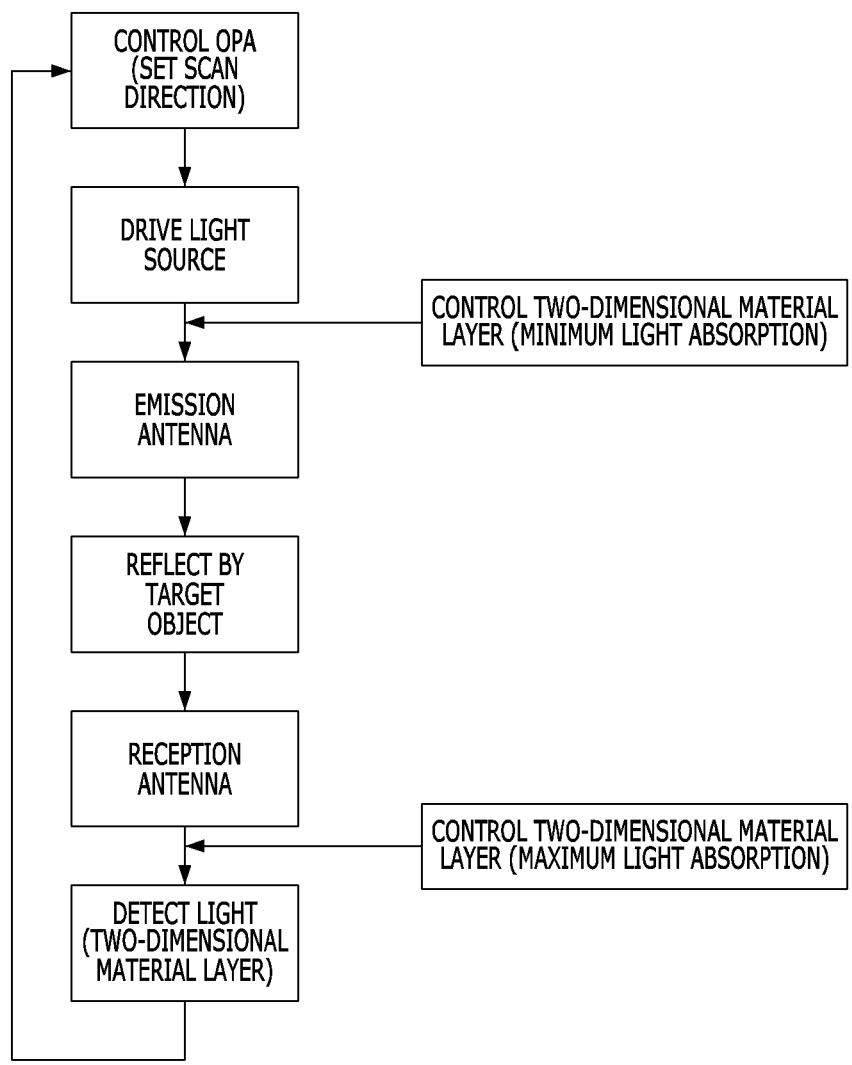
Figure 11:
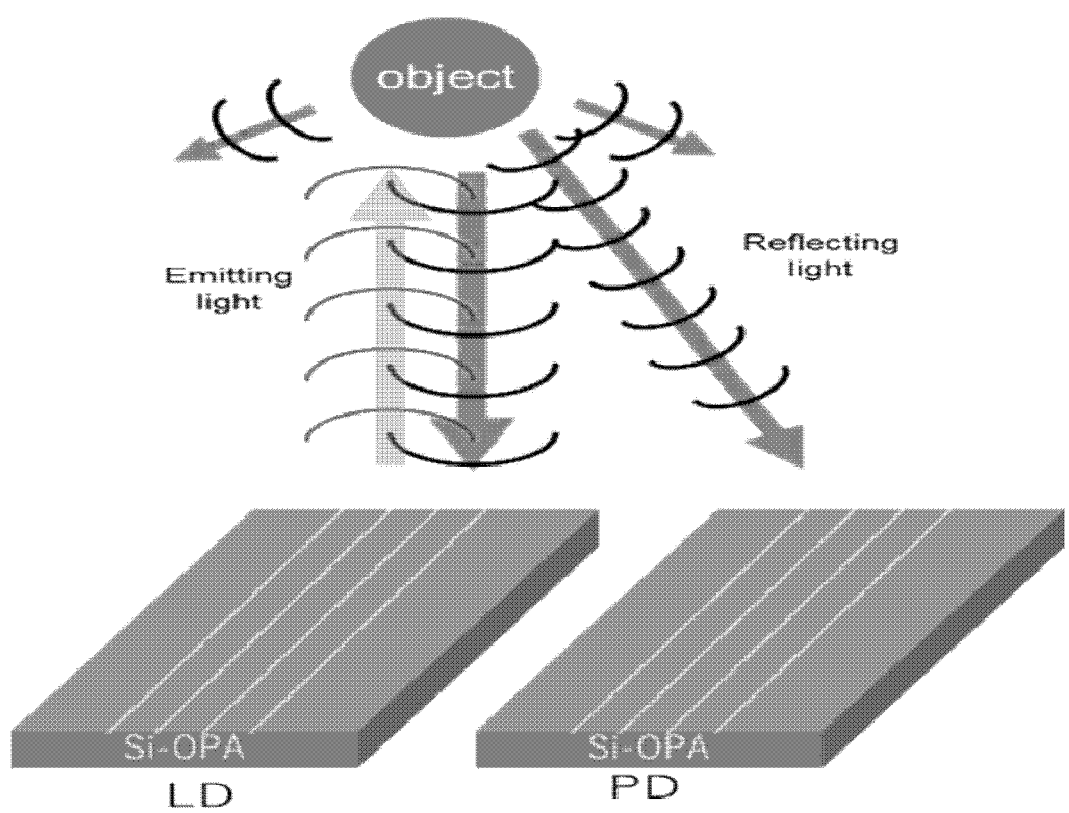
Figure 12:
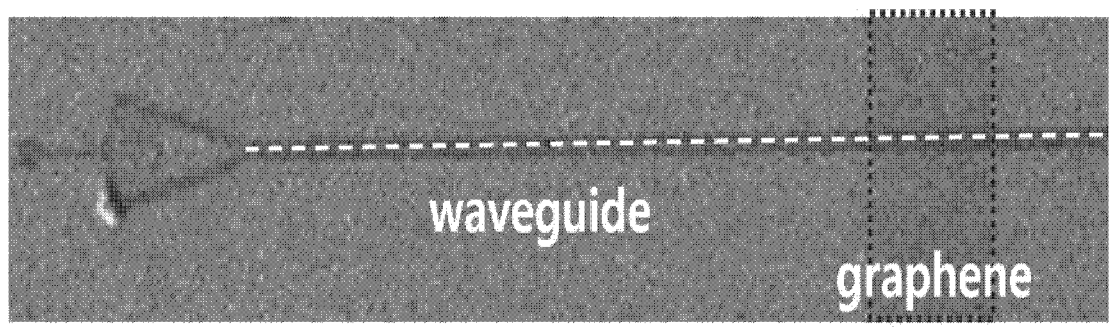

(a) and (b) of FIG. 3 are views illustrating an operating method of a single OPA device according to an embodiment of the present disclosure;

FIG. 4 is a view of a band structure of a two-dimensional material layer of a single OPA device according to an embodiment of the present disclosure;

FIG. 5 is a view of a band structure of a two-dimensional material layer of a single OPA device according to an embodiment of the present disclosure;

FIG. 6 is a conceptual view of a general OPA device of the related art;

FIG. 7 is a conceptual view of a non-single type OPA device of the related art;

FIG. 8 is a flowchart illustrating a manufacturing method of a single OPA device according to an embodiment of the present disclosure;

FIG. 9 is a conceptual view illustrating a photosensing system according to an embodiment of the present disclosure;

FIG. 10 is a flowchart of a photosensing system according to an embodiment of the present disclosure;

FIG. 11 is a conceptual view illustrating a photosensing system of the related art; and FIG. 12 is an image of a single OPA device according to an embodiment of the present disclosure.

DETAILED DESCRIPTION OF THE EMBODIMENT

Hereinafter, the present disclosure will be described more fully with reference to the accompanying drawings, in which exemplary embodiments of the present disclosure are shown.

However, the present disclosure can be realized in various different forms, and is not limited to the embodiments described herein. Accordingly, in order to clearly explain the present disclosure in the drawings, portions not related to the description are omitted. Like reference numerals designate like elements throughout the specification.

Throughout this specification of the present disclosure, when it is described that an element is "coupled" to another element, the element may be "directly coupled" to the other element or "electrically coupled" to the other element through a third element.

Through the specification of the present disclosure, when one member is located "on", "above", "on an upper portion", "below", "under", and "on a lower portion" of the other member, the member may be adjacent to the other member or a third member may be disposed between the above two members.

In the specification of the present disclosure, unless explicitly described to the contrary, the word "comprise" and variations such as "comprises" or "comprising", will be understood to imply the inclusion of stated elements but not the exclusion of any other elements.

The terms "about or approximately" or "substantially" indicating a degree used throughout the specification are used as a numerical value or a meaning close to the numerical value when a unique manufacturing and material tolerance is proposed to the mentioned meaning and also used to prevent unscrupulous infringers from wrongfully using the disclosure in which precise or absolute numerical values are mentioned for better understanding of the present disclosure. Terms used throughout the specification, "~step of ~ing" or "step of~" do not mean "step for~".

Throughout the specification of the present disclosure, the term "combination thereof" included in the expression of Markushi format refers to a mixture or a combination of one or more selected from a group consisting of components described in the expression of the Markushi format and it means that one or more selected from the group consisting of the components is included.

Throughout the specification of the present disclosure, the description of "A and/or B" refers to "A or B" or "A and B".

Hereinafter, a single OPA device of the present disclosure and a photosensing system using the same will be described in detail with reference to embodiments, examples, and drawings. However, the present disclosure is not limited to the embodiments, the examples, and the drawings.

Figure 1:
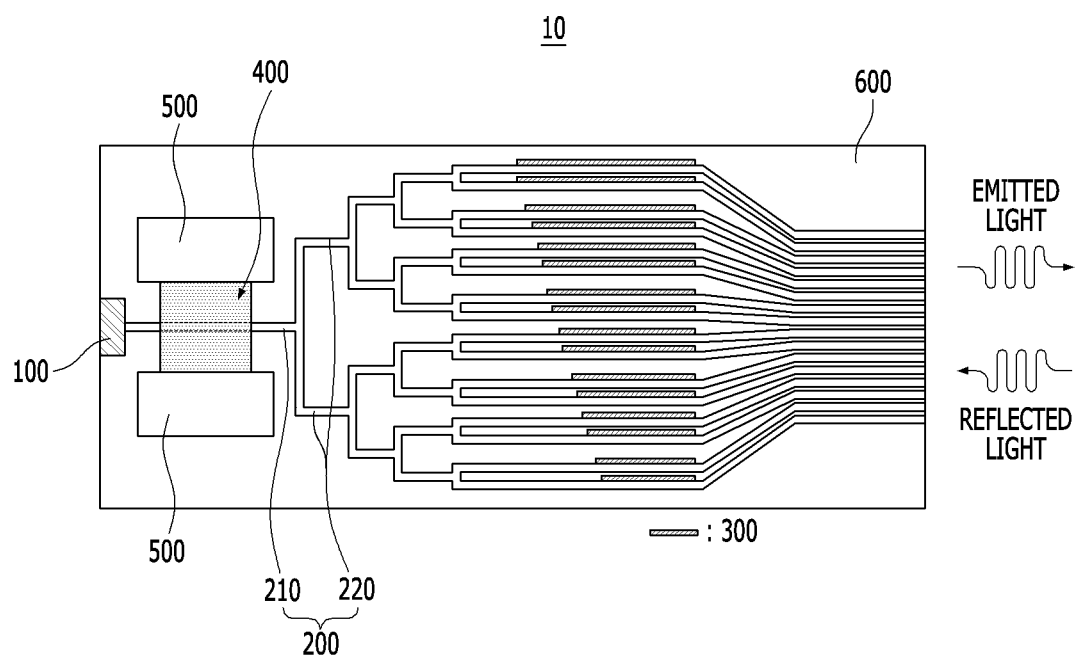
FIG. 1 is a conceptual view of a single OPA device according to an embodiment of the present disclosure.

FIG. 1 is a conceptual view of a single OPA device 10 according to an embodiment of the present disclosure.

As the technical means for achieving the technical object, a first aspect of the present disclosure provides a single optical phased array (OPA) device 10 which includes a light source 100, a waveguide 200 which extends from the light source to allow light incident from the light source 100 to pass through, a modulator 300 which is disposed in the waveguide 200 to modulate a phase of light in the waveguide 200, a two-dimensional material layer 400 which passes or absorbs light incident from the light source 100, and an electrode 500 which supplies charges to the two-dimensional material layer 400. The light incident from the light source 100 passes through the two-dimensional material layer 400, the waveguide 200, and the modulator 300 and is reflected by a target (not illustrated) outside the single OPA device 10 to pass through the modulator 300 and the waveguide 200 and then be absorbed by the two-dimensional material layer 400.

With regard to this, the single OPA device 10 may be formed on a substrate 600, but is not limited thereto.

The OPA device according to the present disclosure refers to a device which irradiates light onto an external object and measures a distance between the external object and the device by means of a time that it takes for the light to be reflected by the external object to be recognized. Such an OPA device is mainly used for a system which detects something with light, such as light detection and ranging (LiDAR).

A general OPA device basically uses a characteristic that a refractive index of a material of the waveguide changes according to a temperature and may control a phase of flowing light by controlling a phase by making a heating wire which controls a phase of light flowing in the waveguide to control a temperature for every waveguide channel which forms the OPA. Light having different phases formed in each waveguide channel is combined in an emission antenna to emit light in an intended direction and light input in a reception antenna may be divided to be divided for every waveguide channel to have different phases (Huygens's principle).

In the OPA device of the related art, a part for emitting light and a part for receiving light are separately configured, but in the single OPA device 10 of the present disclosure, a receiving unit for absorbing light and an emitting unit for emitting light are combined on one substrate so that unlike the OPA device of the related art, it is possible to achieve a reduced size and sequentially control emitted light and received light by single phase control, at one time.

As it will be described below, in the single OPA device 10, light incident from the light source 100 may pass through the two-dimensional material layer 400 and the waveguide 200 to adjust a phase by the modulator 300 and then be emitted toward the external object. The light which is irradiated on the external object is reflected to be absorbed by the two-dimensional material layer 400 via the waveguide 200 of the single OPA device 10. At this time, when the light which is irradiated onto the external object to be reflected is received by the single OPA device 10, the reflected light may further include visible rays as well as the light incident from the light source 100 and the visible rays may be absorbed by the two-dimensional material layer 400. At this time, unlike the light which is incident from the light source 100 to be irradiated onto the external object and then reflected to be received by the single OPA device 10, the visible rays do not include signal information such as a pulse width, so that the visible rays may be removed by the signal processing.

According to an embodiment of the present disclosure, the two-dimensional material layer 400 may include a material selected from a group consisting of graphene, transition metal chalcogenide, hexagonal boron nitride (h-BN), black phosphorus, and combinations thereof, but is not limited thereto. For example, the two-dimensional material layer 400 may include single layer-graphene.

The waveguide 200 according to the present disclosure refers to a path of light which is incident from the light source or light which is reflected by the external target to be input to the single OPA device 10. As it will be described below, the waveguide 200 may include a waveguide 210 which extends from the light source 100, but is not bifurcated and a plurality of bifurcated waveguides 220 which extends from the waveguide 210 which is not bifurcated to be divided into several parts. Unless otherwise specified, the description of the waveguide 200 of the present disclosure refers to at least one waveguide selected from the plurality of bifurcated waveguides 220 and/or a waveguide including the waveguide 210 which is not bifurcated.

According to an embodiment of the present disclosure, the two-dimensional material layer 400 may be formed on the waveguide 210 which is not bifurcated, but is not limited thereto.

According to an embodiment of the present disclosure, the single OPA device 10 may further include a two-dimensional material layer 400 formed on the waveguide 200, but is not limited thereto. Specifically, referring to FIG. 1, the two-dimensional material layer 400 of the single OPA device 10 is formed on the waveguide 210 which is not bifurcated to connect two electrodes 500 of the single OPA device 10. At this time, even though it is omitted in FIG. 1, the two-dimensional material layer 400 may be further formed on the plurality of bifurcated waveguides 220.

At this time, the two-dimensional material layer 400 formed on the waveguide 210 which is not bifurcated and the two-dimensional material layer 400 formed on the plurality of bifurcated waveguides 220 need to be adjacent to the light source 100 more than the modulator 300 formed on the waveguide 200. With regard to this, if the two-dimensional material layer 400 is not adjacent to the light source 100 more than the modulator 300, when the single OPA device 10 receives light reflected from the external target, the reflected light is absorbed by the two-dimensional material layer 400 without changing a phase so that the distinctiveness of the absorbed light may be deteriorated.

According to an embodiment of the present disclosure, the waveguide 200 may include a material selected from a group consisting of a group IV semiconductor material, a group III-V semiconductor material, a group II-VI semiconductor material, oxides, nitrides, and combinations thereof, but is not limited thereto.

According to an embodiment of the present disclosure, the modulator 300 may modulate a phase of light incident from the light source 100 or light reflected by a target, but is not limited thereto.

As it will be described below, the single OPA device 10 according to the present disclosure and the photosensing system (not illustrated) including the same may measure a distance between objects using a time when light is emitted and reflected to be received or a time difference or a phase changed amount when the light is emitted and reflected to be received. Specifically, the distance between the objects may be measured using a velocity c of light and a time when light emitted from the single OPA device 10 is reflected by the target to be received by the single OPA device 10. The modulator 300 according to the present disclosure modulates a phase of light which is incident from the light source 100 or light which is reflected by the target to be received by the single OPA device 10 to measure a distance between the object and the device.

According to an embodiment of the present disclosure, the single OPA device 10 may further include an intermediate layer 510 formed on the two-dimensional material layer 400 formed on the plurality of waveguides 200, but is not limited thereto.

According to an embodiment of the present disclosure, the single OPA device 10 may further include an antenna selected from a group consisting of an emission antenna which irradiates light of the light source 100 onto the target, a reception antenna which receives light reflected from the target, and combinations thereof, but is not limited thereto. For example, the single OPA device 10 may further include a reception/emission-integrated antenna which emits light incident from the light source 100 or receives light reflected from the target and a reception antenna which increases a reception amount of light reflected from the target, but is not limited thereto.

According to an embodiment, the electrode 500 may include a material selected from a group consisting of Au, Pt, Ti, Ag, Ni, Zr, Ta, Zn, Nb, Cr, Co, Mn, Fe, Al, Mg, Si, W, Cu, lanthanum metals, nitrides thereof, oxides thereof, conductive polymers, and combinations thereof, but is not limited thereto.

Figure 2:
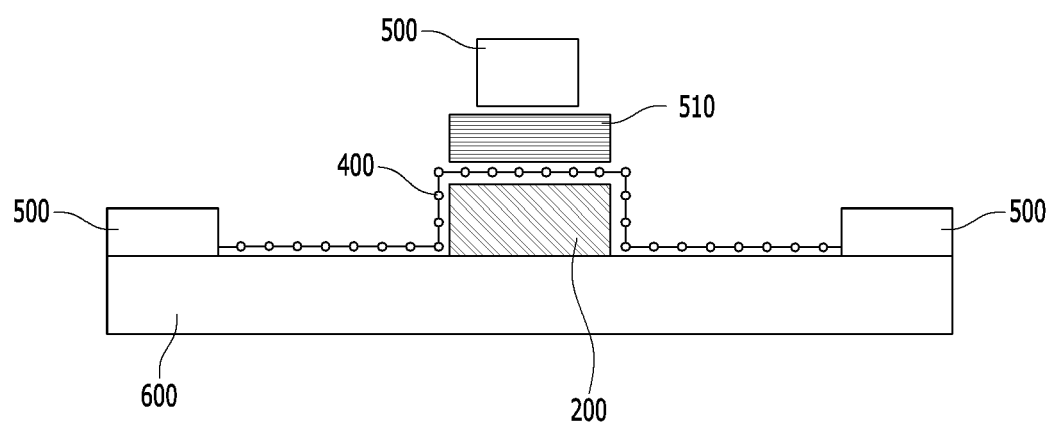
FIG. 2 is a cross-sectional view of a single OPA device according to an embodiment of the present disclosure.

FIG. 2 is a cross-sectional view of a single OPA device 10 according to an embodiment of the present disclosure.

Referring to FIG. 2, three electrodes 500 may be formed on the two-dimensional material layer 400. At this time, left and right electrodes 500 in FIG. 2 refer to a source electrode and a drain electrode which apply a source voltage and a drain voltage to the two-dimensional material layer 400 and an electrode located at the center of FIG. 2 refers to a gate electrode which is formed on the two-dimensional material layer 400 formed on the waveguide 200 to apply a gate voltage to the two-dimensional material layer. However, the two-dimensional material layer 400 formed on the waveguide 200 and the gate electrode should not be in direct contact with each other so that the intermediate layer 510 is provided between the two-dimensional material layer 400 formed on the waveguide 200 and the gate electrode to block the contact therebetween. As it will be described below, the voltage is applied to allow the two-dimensional material layer 400 to pass light incident from the light source 100 or partially pass or partially absorb light reflected from the target. Further, in order to allow the two-dimensional material layer 400 to pass or absorb the reflected light according to the material or the thickness of the intermediate layer 510, a voltage applied to the two-dimensional material layer 400 may vary.

(a) and (b) of FIG. 3 are views illustrating an operating method of a single OPA device 10 according to an embodiment of the present disclosure. Specifically, FIG. 3 illustrates an operating method when the two-dimensional material layer 400 is graphene (Gr) in which (a) of FIG. 3 illustrates that the two-dimensional material layer is a field effect transistor (FET) including Gr and (b) of FIG. 3 illustrates a case of charging a gate oxide as a dielectric and graphene as a gate electrode.

In FIG. 3, the only difference is that the electrode 500 is disposed at an upper end of the graphene (a gating electrode located at the center of FIG. 2) and is disposed at a left side and a right side (a source electrode and a drain electrode located at the left and right of FIG. 2) or disposed above and below the graphene, but the function of controlling the two-dimensional material layer 400 to pass the light by means of the electrode 500 is the same in (a) and (b) of FIG. 3.

According to an embodiment of the present disclosure, according to the voltage applied to the two-dimensional material layer 400, the two-dimensional material layer 400 may pass or absorb light incident from the light source 100, but is not limited thereto.

Generally, the smaller the band gap of the material, the larger the wavelength of light observed through the material. Specifically, when light is irradiated onto the material, if a light energy is smaller than a band gap of the material, the material and the light do not interact. For example, Si has a band gap of 1.12 eV so that it may not interact with light having a wavelength longer than 1.11 μm and Ge has a band gap of 0.67 eV so that it may not interact with light having a wavelength longer than 1.85 μm. A photodetector of the related art uses Si, Ge, or a group III-V material to absorb light having a wavelength of 1.11 μm or less or 1.85 μm or less.

However, the material such as Si or Ge absorbs near-infrared rays having a wavelength of 900 nm to 1500 nm which is available for LiDAR so that there is a problem in that an accuracy of observation is low.

According to an embodiment of the present disclosure, according to a voltage applied to the two-dimensional material layer 400, charge carriers may be accumulated or depleted in an energy band structure of the two-dimensional material layer 400, but are not limited thereto.

FIGS. 4 and 5 are views of a band structure of a two-dimensional material layer 400 of a single OPA device 10 according to an embodiment of the present disclosure.

For example, when the two-dimensional material layer 400 is a single layer of graphene, the energy band structure may have a structure as illustrated in FIGS. 4 and 5. The single layer of graphene may transmit approximately 97% to 98% of light which is vertically irradiated on the graphene and absorb approximately 2% or 3%, regardless of the wavelength. Further, an amount of light which is horizontally irradiated onto the graphene absorbed by the single layer of graphene may be variable according to a distance that the light travels in the single layer of graphene, that is, a horizontal length (width) of the single layer of graphene.

In the meantime, when light is irradiated or a voltage is applied to a single layer graphene, electrons in a valence band of the graphene may absorb some of light energy or be excited into a conduction band by the voltage. At this time, the graphene applied with a positive voltage may have the same effect as the n-type doped semiconductor. When light is irradiated onto the graphene having the same physical property as the n-type semiconductor while applying the voltage, the excitation of electrons by light is blocked to prevent light having a specific energy level or lower from being absorbed into the graphene, which is referred to as Pauli blocking. Further, when the negative voltage is applied to the graphene, the graphene operates as a p-type doped semiconductor to prevent light having a specific energy level or lower from being absorbed into the graphene.

According to an embodiment of the present disclosure, according to a voltage applied to the two-dimensional material layer 400, energies required to excite electrons of the two-dimensional material layer 400 may vary so that a ratio of light which passes through the graphene may be adjusted by adjusting the voltage applied to the two-dimensional material layer 400, but is not limited thereto. With regard to this, in order to allow light having a specific wavelength to pass through the two-dimensional material layer 400, the voltage applied to the two-dimensional material layer 400 may vary according to a type and a thickness of a material of the intermediate layer 510.

For example, when the two-dimensional material layer 400 of the single OPA device 10 is graphene and the intermediate layer 510 is $Al_2O_3$ of 10 nm, if a voltage of +8 V is applied to the graphene, electrons in the valence band of the graphene are not excited by infrared rays having a wavelength of 1500 µm or more so that the infrared rays may pass through the graphene and the distance between the single OPA device and the object may be measured by the infrared rays.

According to an embodiment of the present disclosure, the intermediate layer 510 may have a thickness of 200 nm or less, but it is not limited thereto.

According to an embodiment of the present disclosure, absorptivity of light reflected by the external target may vary according to a distance to pass through the two-dimensional material layer 400, that is, a horizontal length of the two-dimensional material layer 400, but is not limited thereto.

The horizontal length of the two-dimensional material layer 400 may be 1 µm to 1000 µm, but is not limited thereto. As described above, the single layer graphene may absorb more light which is horizontally irradiated onto the two-dimensional material layer 400, in proportion to a distance that the light passes through the single layer graphene.

According to an embodiment of the present disclosure, a wavelength of the light incident from the light source 100 may be 750 nm to 2000 nm, but is not limited thereto. For example, the wavelength of the light incident from the light source 100 may be approximately 750 nm to approximately 2000 nm, approximately 800 nm to approximately 2000 nm, approximately 900 nm to approximately 2000 nm, approximately 1000 nm to approximately 2000 nm, approximately 1100 nm to approximately 2000 nm, approximately 1200 nm to approximately 2000 nm, approximately 1300 nm to approximately 2000 nm, approximately 1400 nm to approximately 2000 nm, approximately 1500 nm to approximately 2000 nm, approximately 1600 nm to approximately 2000 nm, approximately 1700 nm to approximately 2000 nm, approximately 1800 nm to approximately 2000 nm, approximately 1900 nm to approximately 2000 nm, approximately 750 nm to approximately 800 nm, approximately 750 nm to approximately 900 nm, approximately 750 nm to approximately 1000 nm, approximately 750 nm to approximately 1100 nm, approximately 750 nm to approximately 1200 nm, approximately 750 nm to approximately 1300 nm, approximately 750 nm to approximately 1400 nm, approximately 750 nm to approximately 1500 nm, approximately 750 nm to approximately 1600 nm, approximately 750 nm to approximately 1700 nm, approximately 750 nm to approximately 1800 nm, approximately 750 nm to approximately 1900 nm, approximately 800 nm to approximately 1900 nm, approximately 900 nm to approximately 1800 nm, approximately 1000 nm to approximately 1700 nm, approximately 1100 nm to approximately 1600 nm, approximately 1200 nm to approximately 1500 nm, or approximately 1300 nm to approximately 1400 nm, but is not limited thereto. Light which is incident from the light source 100 onto the two-dimensional material layer 400 to be emitted from the single OPA device 10 is reflected by the external target to be mixed with the external visible rays and then received by the single OPA device 10.

As described above, the single OPA device 10 may block, absorb, or pass a part of light reflected by the external target, by the voltage applied to the two-dimensional material layer 400. In contrast, the photodiode 410 of the OPA device 20 of the related art has a band gap larger than the two-dimensional material layer 400 so that it is hard to interact with light having a predetermined wavelength or higher. Therefore, it is difficult to apply the photodiode 410 to the LiDAR to be described below.

Unlike the single OPA device 10 according to the present disclosure, in the OPA device 20 of the related art, a part for emitting light and a part for receiving reflected light are separately configured.

FIGS. 6 and 7 are conceptual views of a non-single type OPA device 20 of the related art.

The single OPA device 10 of FIG. 1 and the non-single type OPA device 20 of FIGS. 6 and 7 have a difference in the part for receiving reflected light. Specifically, in the single OPA device 10, the two-dimensional material layer 400 for receiving light is disposed at the front side of the light source 100 or at the rear side of the modulator 300. In contrast, in the non-single type OPA device 20, the photodiode 410 for receiving light is disposed on a substrate 600 separated from the light source 100 so that for this reason, the space restriction of the non-single type OPA device 20 is larger than that of the single OPA device 10.

With regard to this, the front side of the light source 100 refers to a 3 o'clock direction with respect to the light source 100 of FIG. 1 and the rear side of the modulator 300 refers to a 9 o'clock direction with respect to the modulator 300 of FIG. 1. That is, it means that the two-dimensional material layer 400 is formed on at least one waveguide provided between the light source 100 and the modulator 300.

Further, in the non-single type OPA device 20 of the related art, the light source 100 and the photodiode 410 are provided on separate substrates so that an angle of light emitted from the substrate 600 including the light source 100 and an angle of light reflected by the target are different.

Therefore, the substrate including the photodiode 410 may also include a modulator 300 to adjust a phase of the reflected light.

Further, a second aspect of the present disclosure provides a manufacturing method of a single type OPA device 10 including forming a light source 100, a two-dimensional material layer 400, a waveguide 200, and a modulator 300 on a substrate 600 and forming an electrode 500 on the two-dimensional material layer 400.

A detailed description of repeated parts of the manufacturing method of a single OPA device 10 according to the second aspect of the present disclosure with the first aspect of the present disclosure will be omitted. However, even though the detailed description thereof is omitted, the description of the first aspect of the present disclosure may be applied to the second aspect of the present disclosure in the same manner.

FIG. 8 is a flowchart illustrating a manufacturing method of a single OPA device 10 according to an embodiment of the present disclosure.

First, a light source 100, a two-dimensional material layer 400, a waveguide 200, and a plurality of modulators 300 are formed on a substrate 600 (S100). Specifically, after forming the light source 100 and a waveguide 200 including a waveguide 210 which extends from the light source 100 but is not bifurcated and a plurality of waveguides 220 which extends from the waveguide 210 which is not bifurcated but is bifurcated with regular or irregular intervals to form a plurality of passages, on the substrate 600, at least one modulator 300 is disposed on a partial area of the waveguide 200. Thereafter, the two-dimensional material layer 400 may be disposed at the front side of the light source 100 and on the waveguide 210 which is not bifurcated.

According to an embodiment of the present disclosure, the modulator 300 may be disposed on the waveguide 200, but it is not limited thereto. Desirably, the modulator 300 may be disposed on the plurality of bifurcated waveguides 220.

According to an embodiment of the present disclosure, the manufacturing method of the single OPA device 10 may further include forming the two-dimensional material layer 400 on the plurality of bifurcated waveguides 220, but is not limited thereto.

According to an embodiment of the present disclosure, the two-dimensional material layer 400 may be disposed to be adjacent to the light source 100 more than the modulator 300, but is not limited thereto.

As described above, the two-dimensional material layer 400 measures the distance between the single OPA device 10 and the target by passing light incident from the light source 100 and absorbing or blocking some of light reflected by the external target so that the two-dimensional material layer 400 may be disposed on the waveguide disposed between the light source 100 and the modulator 300.

According to an embodiment of the present disclosure, the manufacturing method of the single OPA device 10 may further include forming an intermediate layer (not illustrated) on the two-dimensional material layer 400 formed on the plurality of bifurcated waveguides 220, but is not limited thereto.

Next, an electrode 500 is formed on the two-dimensional material layer 400 (S200). With regard to this, the electrode 500 may be connected to the two-dimensional material layer 400 formed on the waveguide 210.

According to an embodiment of the present disclosure, the electrode 500 may be formed to form an FET structure which uses the two-dimensional material layer 400 as a conductive channel or form a capacitor using the two-dimensional material layer 400, but is not limited thereto.

According to an embodiment of the present disclosure, the manufacturing method of a single OPA device 10 may further include forming an antenna selected from a group consisting of an emission antenna, a reception antenna, and combinations thereof which extend from any one of the waveguide 200 or the modulator 300, on the substrate 600, but is not limited thereto.

The antenna may include a reception/emission-integrated antenna in which an emission antenna which emits light which is incident from the light source 100 and passes through the two-dimensional material layer 400 and the waveguide 200 to modulate a phase by the modulator 300 to the outside of the single OPA device 10 and a reception antenna which receives the emitted light reflected from the external target are integrated.

Further, a third aspect of the present disclosure provides a photosensing method including emitting light toward the external target from the light source 100 of the single OPA device 10 according to the first aspect, receiving the light reflected from the external target into the single OPA device 10, and absorbing light received into the single OPA device 10 by the two-dimensional material layer 400.

The photosensing method according to the present disclosure refers to a method of measuring a position of an object using an electromagnetic wave like a LiDAR. The LiDAR of the related art uses an Si-based material as a light absorbing material so that the infrared rays cannot be recognized. Further, Ge or InSb can recognize the infrared rays, but there is a problem in the manufacturing process.

FIG. 9 is a conceptual view illustrating a photosensing system according to an embodiment of the present disclosure, FIG. 10 is a flowchart of a photosensing system according to an embodiment of the present disclosure, and FIG. 11 is a conceptual view illustrating a photosensing system of the related art.

Referring to FIGS. 9 and 11, in a single OPA device 10 of the photosensing system according to the present disclosure, the reception antenna and the emission antenna are present on one substrate so as to receive the most light reflected by the external target. However, in the photosensing system including the non-single type OPA device 20 of the related art, the reception antenna and the emission antenna are separately present so that less light than that of the photosensing system including the single OPA device 10 may be received.

Referring to FIG. 10, the photosensing system according to the present disclosure, after setting a scan direction, light is emitted from the OPA to be irradiated onto the target. At this time, the two-dimensional material layer 400 may be adjusted to absorb the minimum amount of light incident from the light source.

Next, the light reflected by the target may be input to the single OPA device 10 by means of the reception antenna and the two-dimensional material layer 400 at this time may be adjusted to absorb the reflected light as much as possible.

According to an embodiment of the present disclosure, a photo absorptivity of the two-dimensional material layer 400 may be adjusted by the voltage applied to the two-dimensional material layer 400, but is not limited thereto.

According to an embodiment of the present disclosure, light incident from the light source 100 may pass through the two-dimensional material layer 400 and light reflected from the external target may be absorbed by the two-dimensional material layer 400, but is not limited thereto.

Hereinafter, the present disclosure will be described in more detail with respect to exemplary embodiments, but the following exemplary embodiments are set forth to illustrate, but are not to be construed to limit the scope of the present disclosure.

Exemplary Embodiment 1

An Si wafer substrate including a light source, a waveguide which extended from the light source, but was not bifurcated, a plurality of bifurcated waveguides which extended from the waveguide which was not bifurcated to be divided with regular or irregular intervals, and a modulator formed on the plurality of bifurcated waveguides was prepared. Next, graphene was transferred onto the substrate to form a two-dimensional material layer. Next, the graphene was patterned with a predetermined thickness and Au/Cr was thermally-deposited on the graphene to form an electrode. Next, $Al_2O_3$ was deposited on the graphene formed on the waveguide using ALD to form a blocking oxide and Au/Cr was thermally-deposited on the $Al_2O_3$ to form a gating electrode.

With regard to this, the Au/Cr electrode was formed on the graphene, but was not formed on the waveguide, but the Au/Cr gating electrode was formed on both the graphene and the waveguide.

FIG. 12 is an image of the single OPA device according to the embodiment so that it is confirmed that the graphene is transferred onto the waveguide which is not bifurcated.

The above-description of the present disclosure is illustrative only and it is understood by those skilled in the art that the present disclosure may be easily modified to another specific type without changing the technical spirit of an essential feature of the present disclosure. Thus, it is to be appreciated that embodiments described above are intended to be illustrative in every sense, and not restrictive. For example, each component which is described as a singular form may be divided to be implemented and similarly, components which are described as a divided form may be combined to be implemented.

The scope of the present disclosure is represented by the claims to be described below rather than the detailed description, and it is to be interpreted that the meaning and scope of the claims and all the changes or modified forms derived from the equivalents thereof come within the scope of the present disclosure.

What is claimed is:

1. A single optical phased array (OPA) device, comprising:
    a light source;
    a waveguide which extends from the light source to allow light incident from the light source to pass through;
    a plurality of modulators which is disposed in the waveguide to modulate a phase of light in the waveguide;
    a two-dimensional material layer which passes or absorbs light incident from the light source; and
    an electrode which supplies charges to the two-dimensional material layer,
    wherein the light incident from the light source passes through the two-dimensional material layer, the waveguide, and the modulator and is reflected by an external target of the single OPA device to pass through the modulator and the waveguide, and then is absorbed by the two-dimensional material layer.

2. The single OPA device according to claim 1, wherein the two-dimensional material layer passes or absorbs light incident from the light source according to a voltage applied to the two-dimensional material layer.

3. The single OPA device according to claim 1, wherein charge carriers are accumulated or depleted in an energy band structure of the two-dimensional material layer, according to a voltage applied to the two-dimensional material layer.

4. The single OPA device according to claim 1, wherein the modulator modulates a phase of light emitted from the OPA device or light reflected by the target.

5. The single OPA device according to claim 1, wherein the two-dimensional material layer includes a material selected from a group consisting of graphene, transition metal chalcogenide, hexagonal boron nitride (h-BN), black phosphorus, and combinations thereof.

6. The single OPA device according to claim 1, wherein a wavelength of light incident from the light source is 750 nm to 2000 nm.

7. The single OPA device according to claim 1, wherein the plurality of waveguides includes a material selected from a group consisting of a group IV semiconductor material, a group III-V semiconductor material, a group II-VI semiconductor material, oxides, nitrides, and combinations thereof.

8. The single OPA device according to claim 1, wherein the electrode includes a material selected from a group consisting of Au, Pt, Ti, Ag, Ni, Zr, Ta, Zn, Nb, Cr, Co, Mn, Fe, Al, Mg, Si, W, Cu, lanthanum metals, nitrides thereof, oxides thereof, conductive polymers, and combinations thereof.

9. The single OPA device according to claim 1, further comprising:
    an antenna selected from a group of an emission antenna which irradiates light of the light source onto the target, a reception antenna which receives light reflected from the target, and combinations thereof.

10. The single OPA device according to claim 1, further comprising:
    a two-dimensional material layer formed on the waveguide.

11. The single OPA device according to claim 10, further comprising:
    an intermediate layer formed on the two-dimensional material layer formed on the waveguide.

12. A photosensing method, comprising:
    emitting light toward an external target from a light source of the single OPA device according to claim 1;
    receiving light reflected from the external target into the single OPA device; and
    absorbing light received into the single OPA device by a two-dimensional material layer.

13. The photosensing method according to claim 12, wherein a photo absorptivity of the two-dimensional material layer is adjusted by a voltage applied to the two-dimensional material layer.

14. The photosensing method according to claim 13, wherein light incident from the light source passes through the two-dimensional material layer and light reflected from the external target is absorbed by the two-dimensional material layer.

15. A manufacturing method of a single OPA device, comprising:
    forming a light source, a two-dimensional material layer, a waveguide, and a plurality of modulators on a substrate; and
    forming an electrode on the two-dimensional material layer, wherein the light source is formed so that light incident from the light source passes through the two-dimensional material layer, the waveguide, and the modulator and is reflected by an external target of the single OPA device to pass through the plurality of modulators and the waveguide, and then is absorbed by the two-dimensional material layer.

16. The manufacturing method of a single OPA device according to claim 15, further comprising:
   forming a two-dimensional material layer on the plurality of waveguides.

17. The manufacturing method of a single OPA device according to claim 16, further comprising:
   forming an intermediate layer on the two-dimensional material layer formed on the plurality of waveguides.

18. The manufacturing method of a single OPA device according to claim 15, further comprising:
   forming an antenna selected from a group of an emission antenna, a reception antenna, and combinations thereof which extend from any one of the plurality of waveguides and the plurality of modulators, on the substrate.

* * * * *